(12) United States Patent
Zoller et al.

(10) Patent No.: US 7,007,795 B2
(45) Date of Patent: Mar. 7, 2006

(54) TRANSPORT DEVICE WITH CONTACT-FREE TRANSMISSION COUPLING

(75) Inventors: Ludwig Zoller, Osterburken (DE); Dirk Watzlawek, Limbach/Heidersbach (DE)

(73) Assignee: Bleichert Forderanlagen GmbH, Osterburken (DE)

( * ) Notice: Subject to any disclaimer, the term of this patent is extended or adjusted under 35 U.S.C. 154(b) by 0 days.

(21) Appl. No.: 10/422,219

(22) Filed: Apr. 24, 2003

(65) Prior Publication Data

US 2003/0234161 A1    Dec. 25, 2003

(30) Foreign Application Priority Data

Jun. 24, 2002 (DE) ............... 102 28 026

(51) Int. Cl.
B65G 25/00 (2006.01)
B65G 29/00 (2006.01)
B65G 47/84 (2006.01)
B65G 49/00 (2006.01)
B65G 37/00 (2006.01)

(52) U.S. Cl. ............... 198/803.2; 198/465.3; 198/687.1; 198/788; 198/791

(58) Field of Classification Search ........... 198/803.2, 198/465.3, 867.13, 867.14, 687.1, 465.4, 198/788, 791, 792; 193/35 A
See application file for complete search history.

(56) References Cited

U.S. PATENT DOCUMENTS

| | | | |
|---|---|---|---|
| 3,610,406 A | * | 10/1971 | Fleischauer et al. ...... 193/35 A |
| 4,316,535 A | * | 2/1982 | Brems et al. ............ 198/465.4 |
| 4,351,241 A | * | 9/1982 | Brems et al. ............ 198/465.4 |
| 4,359,945 A | * | 11/1982 | Brems et al. ............ 198/465.4 |
| 4,782,930 A | | 11/1988 | Kuroiwa et al. |
| 5,183,150 A | * | 2/1993 | Chary et al. ............... 198/782 |
| 5,884,742 A | | 3/1999 | Spintzyk |
| 6,007,303 A | | 12/1999 | Schmidt |
| 6,220,024 B1 | | 4/2001 | Spintzyk |
| 6,267,211 B1 | | 7/2001 | Heintzmann et al. |

FOREIGN PATENT DOCUMENTS

| | | |
|---|---|---|
| DE | 6933801 G | 8/1969 |
| DE | G 85 19 180.9 | 12/1985 |
| DE | 38 28 422 C1 | 4/1989 |
| DE | G 88 12 338.3 | 3/1990 |
| DE | 41 09 828 C1 | 6/1992 |
| DE | 37 50 957 T2 | 7/1995 |
| DE | 37 03 165 C3 | 9/1995 |
| DE | 196 03 148 C1 | 7/1997 |
| DE | 197 46 359 A1 | 7/1998 |
| DE | 197 07 172 C1 | 10/1998 |
| DE | 197 36 797 A1 | 2/1999 |
| DE | 198 15 445 C1 | 7/1999 |
| DE | 100 27 433 A1 | 11/2001 |
| FR | 788892 | 1/1958 |
| WO | WO 88/02321 | 4/1988 |

* cited by examiner

Primary Examiner—Gene O. Crawford
(74) Attorney, Agent, or Firm—Leydig, Voit & Mayer, Ltd (57) ABSTRACT

A transport conveyor for workpieces, pallets, or workpiece carriers which includes a drive transmission that includes a traction coupling that interrupts the transfer of torque and driving force to the conveyor rollers, belt or the like upon an interruption in the movement of the workpieces, pallets or workpiece carriers on the conveyor. The transmission traction device includes contact-free couplings which can be integrated in the rollers or be mounted outside the drive path of the rollers. Because the couplings operate without physical contact, they are free from wear commonly incurred in the drive transmission as an incident to the interruption of workpiece movement.

47 Claims, 7 Drawing Sheets

TRANSPORT DEVICE WITH CONTACT-FREE TRANSMISSION COUPLING

FIELD OF THE INVENTION

The present invention relates generally to workpiece conveyor or transfer systems, and more particularly, to systems of such type in which the movement of items being conveyed or transferred can be momentarily interrupted or stopped.

BACKGROUND OF THE INVENTION

In order to move workpieces from one processing station to another roller conveyors commonly are used. Roller conveyors, such as shown in GB 788 892, consist of a frame upon which axially parallel rollers are rotatably mounted in side-by-side relation to each other. The workpieces run over the rollers, either directly on the rollers or by being attached to workpiece carriers.

At the output or downstream end of the roller conveyor, the workpieces should be in a waiting line with as few intervening gaps as possible. For the most part, the workpieces are not taken off at the same rate as they are supplied at the input end of the roller conveyor. Therefore, the workpieces must be moved from the input of the end roller conveyor to the end of the waiting line without being pulled off the conveyor. This inevitably leads to the situation where either the rollers slip under the workpiece carriers or workpieces, as is typical for roller conveyors, or where the rollers, which are in frictional contact with a workpiece or a workpiece carrier, become locked.

Due to cost reasons, it is not possible for each roller or each workpiece carrier to have its own drive. Rather, all of the rollers are simultaneously set in rotation by means of a transmission element in the form of a chain toothed belt, or a shaft.

Since slippage of the rollers under the workpieces or workpiece carriers is undesirable, stoppage of the roller is effected with the aid of frictional couplings. The frictional coupling for each roller acts like a gear between the given roller and the transmission element, which couples the roller to the drive motor. Disadvantages of frictional couplings include wear and tear of the components and the necessity of having to set the traction moment or the slippage moment by means of springs.

The problems with circular conveyors that transport pallets with the aid of endless-belt conveyor are similar. The pallets are led onto the conveyor offset from each other and are hauled by a transmission means in the form of a chain, a toothed belt, or the like. If the pallet stays in place, the pallet must not block the transmission means since other non-blocked pallets must continue to be moved. A given pallet is coupled by means of a gear to the transmission means, which begins to rotate as soon as the course of movement of the pallet is blocked. Frictional couplings also have been used for such circular conveyors.

The wear and tear on the frictional couplings is relatively high because the ratio between standby time of a roller or a workpiece carrier and the running time is relatively large. This means that the frictional couplings are in a slipping condition of operation most of the time.

OBJECTS AND SUMMARY OF THE INVENTION

It is an object of the present invention to provide a workpiece conveyor or transfer system which has longer service life and less maintenance than conventional systems.

Another object is to provide a conveyor or transfer system as described above in which movement of workpieces or other items being transferred or conveyed can be interrupted, without causing excessive wear to the components of the drive system for the conveyor or transfer system.

Still another object is to provide a workpiece conveyor transfer system in which input and output elements of the traction drive cooperate in a non-physical contact manner.

The invention may be carried out in various forms including workpiece transfer systems, pallet circular conveyors, or roller conveyors. In each device, instead of the frictional couplings between the input element and the output element of the traction device, couplings are provided that are not subject to wear and tear, since they work in a contact-free manner. Such couplings can be configured in the form of hysteresis couplings or viscous couplings.

For viscous couplings, a highly viscous medium is used so that considerable shear forces can be transferred. By appropriate selection of the viscous medium, a good temperature profile is achieved, which enables the generation of the necessary traction moment in the required temperature range.

For the viscous coupling, a traction element, which is essentially disk shaped, runs in a closed, pot-shaped space, wherein the gap between the interior of the pot-shaped element and the essentially disk-shaped element is filled with a highly viscous medium. The two parts that move relative to each other are not in direct contact with each other. The advantage of this arrangement is that it is very small. Thus, it is particularly suited for arrangements in which little space is available.

The other type of coupling that is free from wear and tear is the hysteresis coupling. For this type of coupling, opposite a part exhibiting hysteresis and/or remanence is a part that is permanently magnetized or magnetized by means of current. If the magnetized part is rotated relative to the part exhibiting hysteresis and/or remanence, the part exhibiting hysteresis and/or remanence is correspondingly remagnetized or driven. Because the part exhibiting hysteresis and/or remanence preferably is highly hysteretic, the remagnetizing process requires work. Hence, the two parts can only be rotated relative to each other with an expenditure of force. The advantage of the hysteresis coupling is that its traction moment is constant over an extremely wide temperature range.

For both types of couplings, no adjustments are required. In the case of the hysteresis coupling, the traction moment is derived from the material properties of the part exhibiting hysteresis and/or remanence and the permanent magnet, as well as the air gap between the parts, which can be precisely set during manufacture. The same applies for the gap for the viscous coupling. Here, the gap can be precisely preset during manufacture so that later adjustment attempts are unnecessary.

For the hysteresis coupling, it also is advantageous if the coupling is completely encapsulated. Otherwise, the penetration of magnetic particles could change the behavior of the coupling. Therefore, encapsulation, particularly with magnetically shielded material, also is an advantage so that no ferromagnetic particles collect over time on the outside of the housing of the hysteresis coupling. This is particularly important when the arrangement is operated in an environment with iron particles.

It will be understood that such contact-free couplings can be mounted between the transmission device and the pallet, or the roller, or within the roller.

Other objects and advantages of the invention will become apparent upon reading the following detailed description and upon reference to the drawings, in which:

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF PREFERRED EMBODIMENTS

Figure 1:
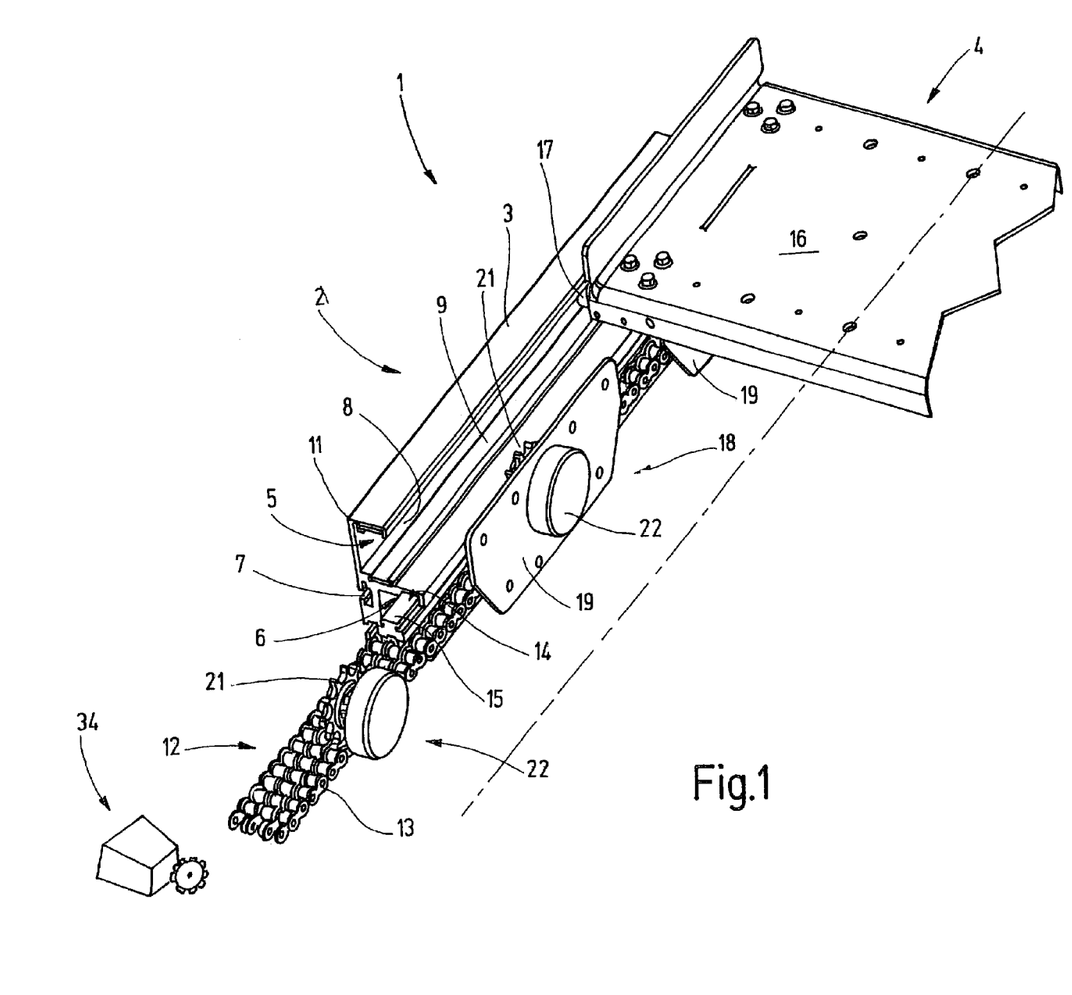
FIG. 1 is a fragmentary perspective of a circular pallet conveyor in accordance with the invention.

Referring now more particularly to FIG. 1 of the drawings, there is shown a circular pallet conveyor 1 in accordance with the invention. The conveyor includes a frame 2 having guide rails 3, only one of which is shown in the schematic depiction. It will be understood that a second similar guide rail runs parallel to the visible guide rail 3. Between the two guide rails 3, pallets 4 are movable in a longitudinal direction. The guide rails 3 are mere images of each other, and hence, only one need be described in detail.

As can be seen in FIG. 1, the guide rail 3 is formed with a first track groove 5 for the pallet 4, a guide groove 6, and also if necessary, additional attachment grooves 7. The track groove 5 essentially has a rectangular cross section and opens at a slot 8 in the direction towards the opposite guide rail 3. The track groove 5 is located in the top part of the guide rail 3. Conveyor belts 9, 11 can be disposed within the track groove 5 in order to prevent running noises with the pallet 4.

The lower guide groove 6 is formed such that a triple roller link chain 12, which contains three series of rollers one next to another, can slide through the groove. Two of the series of rollers lie in the guide groove 6, while a third series of rollers 13 extends beyond the flat side of the guide rail 3 facing the opposite guide rail 3. In the region of the guide groove 6, the guide rail 3 has a greater thickness than in the region of the track groove 5.

In addition, in a groove 14 formed in the guide groove 6 there is a chain hold-down device 15, which ensures that the roller link chain 12 can move through the guide rail 3 in the position shown and ensures that the chain slides on a lower groove edge thereof. The chain 12 cannot slide out of the guide groove 6. The pallet 4 includes a table or plate-shaped support 16, on which a workpiece is to be placed. On the two outer sides of the support adjacent to corresponding guide rails 3, guide rollers 17 are rotatably mounted, which are guided in corresponding track grooves 5. Due to the perspective, only one of four track rollers 17 can be seen. The track rollers 17 are mounted axially parallel to each other, with two track rollers 17 on each outer side so that the pallet 4 cannot swing about its transverse axis in the track groove 5.

For the kinematic connection of the roller link chain 12 to the pallet 16, a traction device 18 is provided which has an end plate 19 under the pallet 4. The traction device 18, which is illustrated separated from the pallet 16, includes an input means in the form of a chain pinion gear 21, as well as an output means in the form of a flange plate 19. The flange plate 19 is connected to the workpiece transport support 16 as a part of the pallet 4. The pinion gear 21 interlocks with the roller link chain 12 and can rotate relative to the flange plate 19 about an axis that is parallel to the running axes of the track rollers 17.

In accordance with the invention, the coupling between the input element 21 and the flange plate 19 is effected through a contact-free coupling 22 that prevents wear to the coupling as a result of the interruption of the flow or transfer of items along the conveyor. To this end, in the embodiment illustrated in FIG. 2, the contact-free coupling is a hysteresis coupling 22. The hysteresis coupling 22 in this case has a pot-shaped housing part 23, which is closed by a disk-shaped cover 24. By means of the cover 24, the hysteresis coupling 22 may be threaded onto the flange plate 19, or otherwise connected thereto. The disk-shaped cover 24 is formed with a concentric hole 25, in which a roller bearing 26 is mounted from the rear side. A shaft 27 is supported with the aid of the roller bearing 26 so that it can rotate. The pinion gear 21 is connected to the shaft so that they rotate together.

Figure 2:
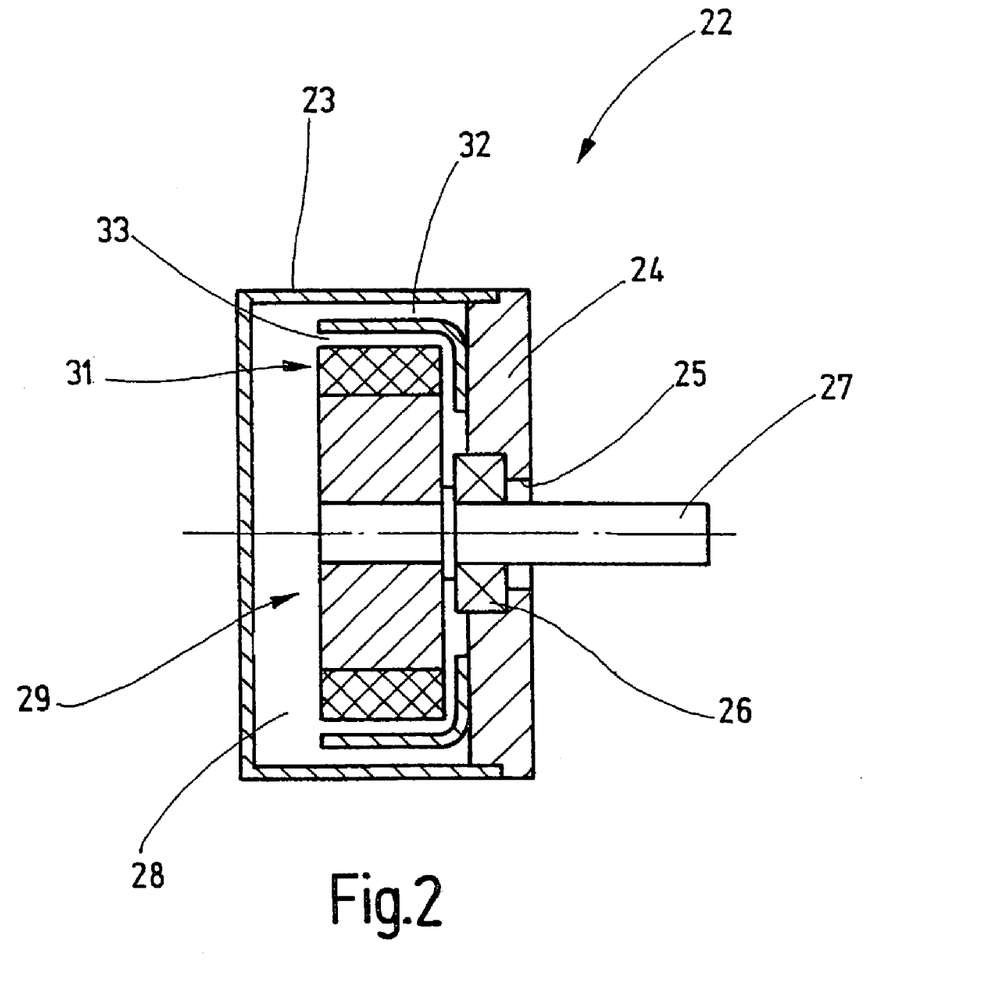
FIG. 2 is a longitudinal section of one of the hysteresis coupling used in the conveyor shown in FIG. 1.

A first coupling part 29 is connected to the shaft 27 so that they rotate together within an interior space 28 enclosed by the pot-shaped housing part 23 and the disk-shaped cover 24. The first coupling part 29 has the form of a thick disk. On the outer perimeter of this part there is a permanently magnetized ring 31 having an outer circumferential surface concentric to the axis of the shaft 27. A second coupling part 32 is formed by a ferromagnetic bowl-shaped part, which is connected to the disk-shaped cover 24 so that they rotate together. The coupling part 32 exhibits hysteresis and/or remanence. The outer circumferential surface of the permanent magnet ring 31 is located opposite the inner side of the second bowl-shaped coupling part 32 with a small air gap 33 therebetween.

The permanently magnetized ring 31 is alternately magnetized so that north and south poles alternate in the circumferential direction on the outer circumferential surface. The magnetic loop is thus closed from one north pole to an adjacent south pole on the outer side of the magnet ring 31 across the air gap 33 and the opposite second coupling part 32, which acts as a radial magnetic yoke.

The material for the second coupling part 32 is selected such that it is highly hysteretic. Highly hysteretic means that the position of the magnetic field in the environment must be changed by a considerable degree before the magnetization in the ferromagnetic part follows this change. The magnetization in the second magnetic part is required to maintain its spatial position in the second magnetic coupling part 32.

Because the remagnetization in the second coupling part 32 requires work, a torque is produced at the shaft 27, which is directed against a torque required to turn the shaft 27 in either of the two directions of rotation. The magnitude of the torque is affected by the size of the air gap 33, the remanence properties of the second coupling part 32, and the field strengths generated by the magnets in the magnets 31.

The arrangement described thus far operates as follows:

Through an appropriate gear motor 34 of the pallet circular conveyor 1, the roller link chain 12, which runs as an endless chain is set in motion. The roller link chain 12 thus runs at a constant track speed through the lower guide groove 6. The pinion gear 21 engaged with the roller link chain 12 can only rotate relative to the pallet 4 if the holding moment of the hysteresis coupling 22 is overcome. As long as that is not the case, the pinion gear 21 does not turn, and the pallet 4 is hauled along the guide rails 3 through the frame 1.

As soon as the illustrated pallet 4 contacts a stop or an already stopped pallet 4 and its further passage is blocked, the pinion gear 21 begins to turn. The connection between the roller link chain 12 and the pallet 4 is simultaneously decoupled, wherein a residual force remains, which pushes the pallet 4 in the transport direction. The force with which the pallet 4 is pressed against the stationary leading pallet 4 or a stop is proportional to the traction moment of the hysteresis coupling 22 and inversely proportional to the radius of the pinion gear 21.

Figure 3:
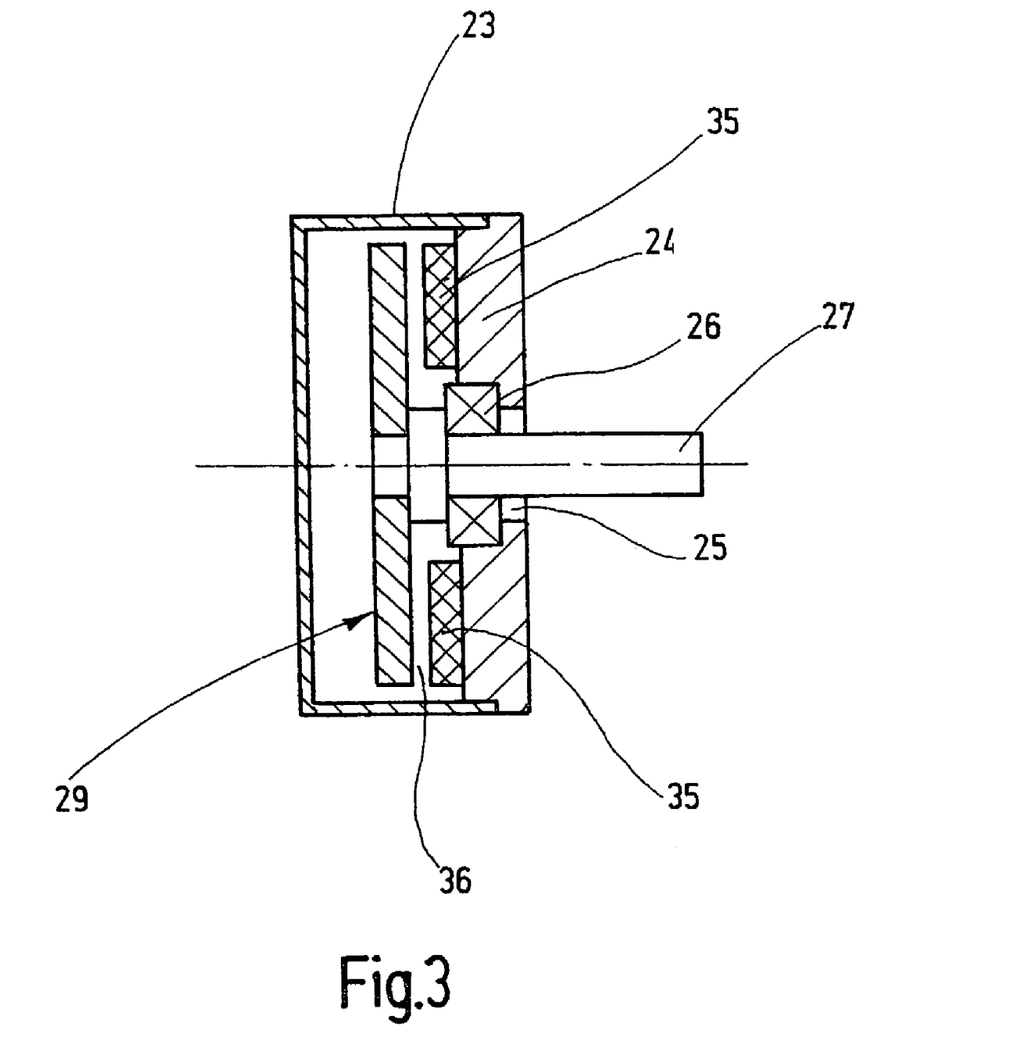
FIG. 3 is a longitudinal section of an alternative embodiment of hysteresis coupling for the circular pallet conveyor shown in FIG. 1.

An alternative embodiment of the hysteresis coupling 22 in accordance with the invention is shown in FIG. 3 in which the magnets are attached as individual discrete magnet plates 35 next to each other on the inner side of the disk-shaped cover 24. The magnets 35 are individual magnetic disks, which are discrete circular segments, that are magnetized in the axial direction. They are attached on the disk-shaped cover 24 next to each other so that north and south poles alternate in the same axial direction. The first coupling part 29 is formed as a ferromagnetic disk, which runs with a small axial gap 36 in front of the flat front side of the magnets 35.

With the arrangement shown in FIG. 2, a slightly smaller axial final depth is possible than with the embodiment from FIG. 3, which, in contrast, can be formed with smaller diameters. It will be understood that the choice between the two variants may be made by the manufacturer depending on the spatial requirements.

Figure 4:
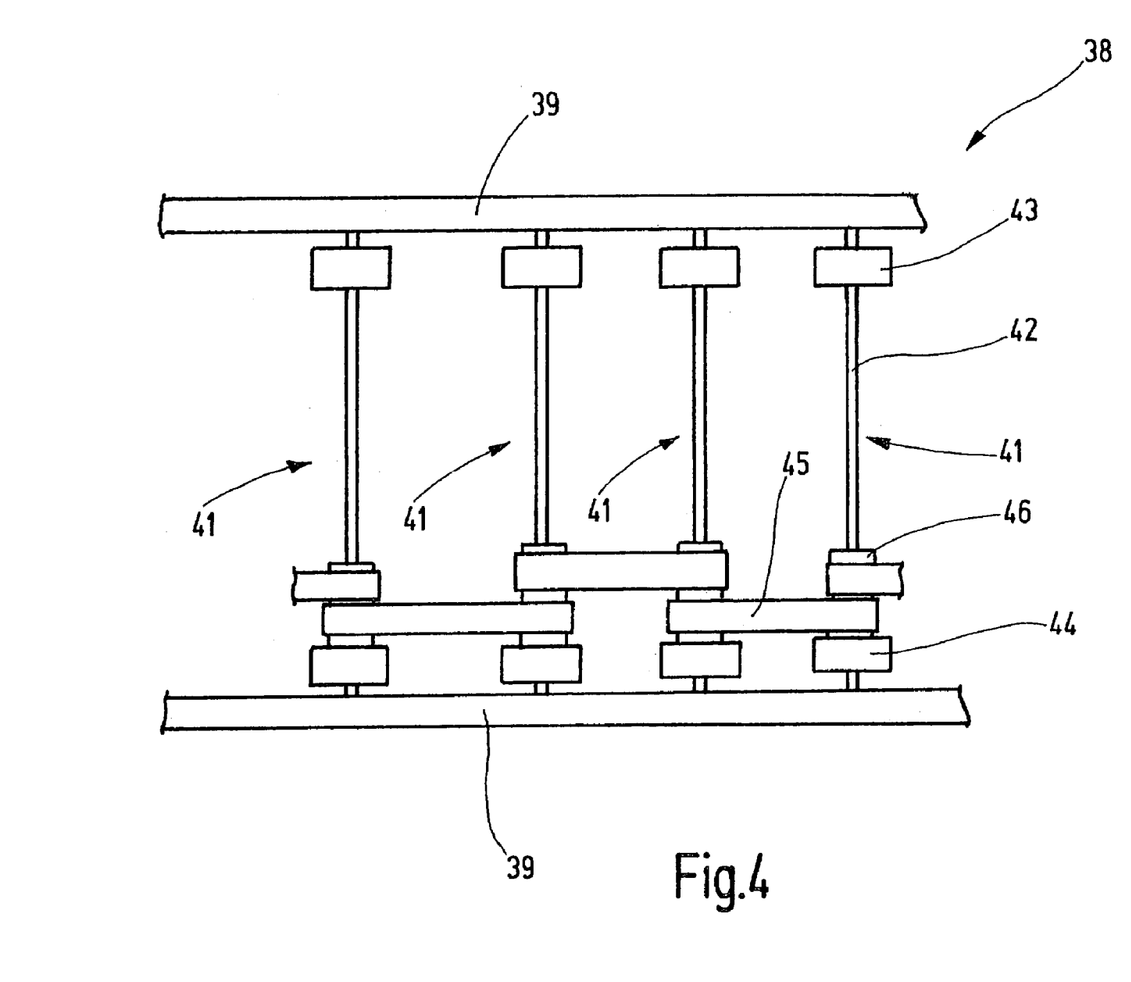
FIG. 4 is a top view of a skid roller conveyor having drive couplings in accordance with the invention.

Referring now to FIG. 4, there is shown a skid roller conveyor 38 having contact-free couplings in the traction devices in accordance with the invention. Between two parallel longitudinal beams 39 there are several axially parallel skid rollers 41. Each skid roller 41 consists of an axle 42 on which two carrier disks 43, 44 are attached so that they rotate together at a distance from each other. The carrier disks 43, 44 are circular disks and act as rollers with running surfaces for workpiece carriers running on top of these rollers. Every two adjacent skid rollers 41 are coupled together as shown by means of an endless drive element, such as a flat or toothed belt 44, so that the rollers rotate together.

Figure 5:
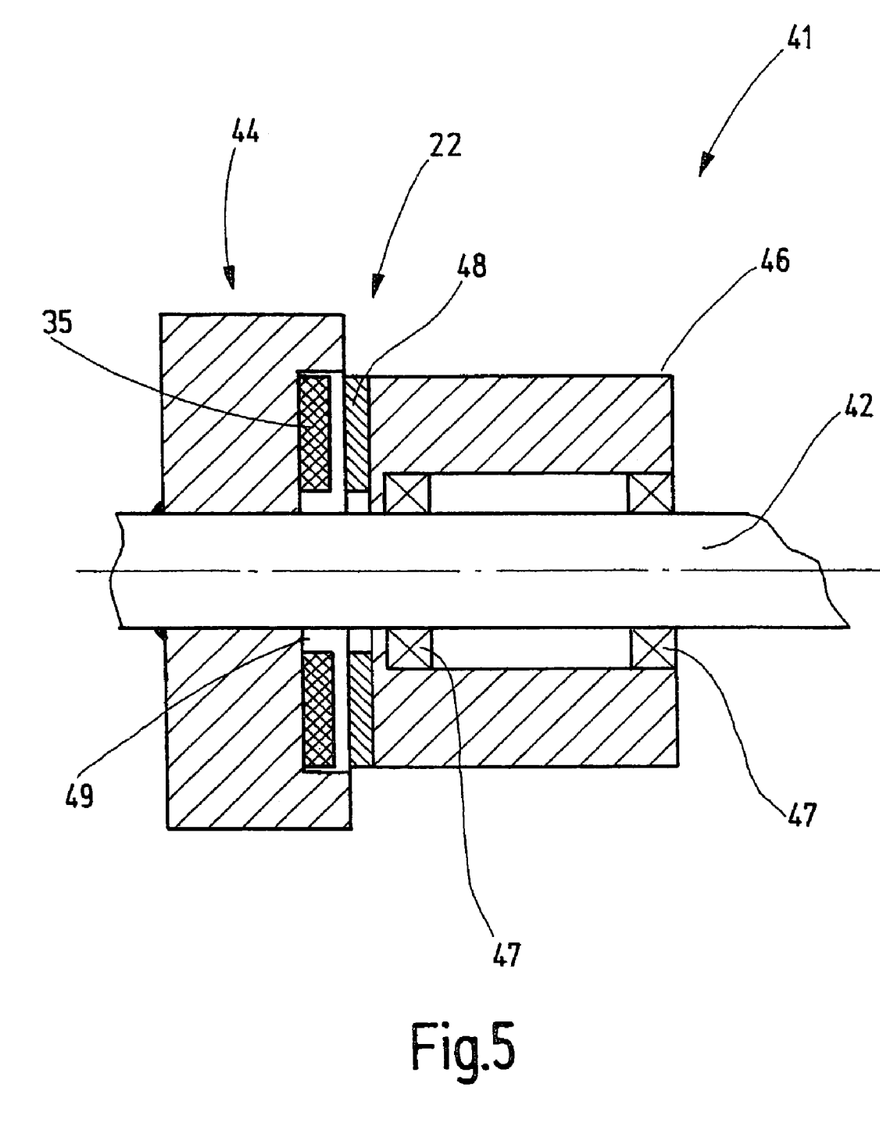
FIG. 5 is a longitudinal section of one of the skid coupling rollers of the skid roller conveyor shown in FIG. 4.

In carrying out this embodiment of the invention, an overdrive body 46 is provided in a shaft of the skid roller 41, which is rotationally coupled by means of a hysteresis coupling 22 to the carrier disk 44, as depicted in FIG. 5. The overdrive body 46 is tubular or sleeve-shaped and is mounted on the shaft 42 with the aid of two roller bearings 47. The body in this case has an outer circumferential surface that is cylindrical and smooth, but alternatively, could be provided with toothing. The axial length permits the attachment of two drive belts. On its outer side adjacent the carrier disk 44, the overdrive body 46 carries a ferromagnetic disk 48, which is highly hysteretic.

The carrier disk 44 is on its side adjacent to the overdrive body 46 and has a counter bore 49, in which a plurality of magnetic disks 35 are attached, e.g., by adhesive, each being adjacent to each other in the circumferential direction. This produces an arrangement that corresponds to the arrangement shown in FIG. 3.

The illustrated skid roller conveyor 38 operates as follows:

By means of an appropriate drive device, one of the overdrive bodies 46 is set in rotation. Because this overdrive body 46 is coupled to the adjacent overdrive body by means of the endless drive element 45, the next overdrive body 46 is also set in rotation, etc. The kinematic coupling of all of the overdrive bodies 46 is effected because each overdrive body 46 is coupled so that they rotate together by means of two endless drive elements 45 with the two adjacent overdrive bodies. The overdrive body 46 can rotate freely due to the roller bearing 47 on the shaft 42.

The hysteresis coupling 22 formed by the ferromagnetic disk 48 and the magnets 35 tends to turn with the support disk 44 as long as the support disk 44 is not held with a moment that is greater than the traction moment by the hysteresis coupling 22. Thus the torque of the hysteresis coupling 22 is transferred to the carrier disk 44 and from there over the shaft 41, which is coupled so that it rotates with the carrier disk 44, to the other carrier disk 43 of the same transport 41.

Thus, the skids running over the skid roller conveyor 38 are further transported corresponding to the rpm of the skid rollers 41. If a running skid contacts a stop or a leading skid is stopped, hysteresis coupling is overcome. The overdrive body 46, which is mounted so that it can rotate on the shaft 41, can continue to run. As soon as the held skid becomes free, it is set back in motion until it contacts a new stop.

The coupling connection between the overdrive body 46 and the carrier disk 44 is free from contact, and thus it is also free from wear and tear. The output of energy that occurs during hauling of the hysteresis coupling can be dissipated without any additional means since it is not large enough to cause significant heating.

Figure 6:
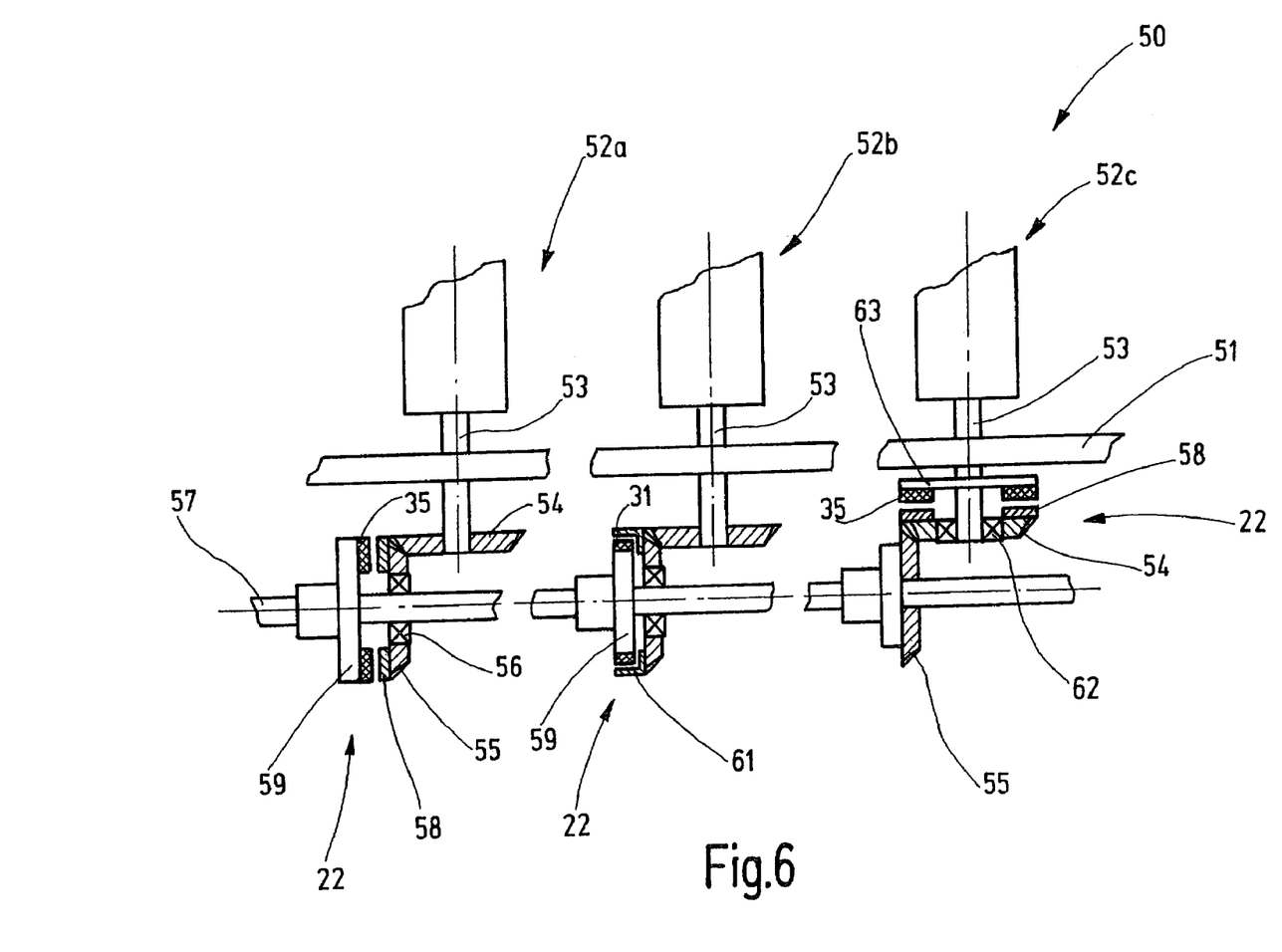
FIG. 6 is a schematic of a roller conveyor with hysteresis couplings for the gear drive of the roller shafts in accordance with the invention.

Still a further alternative of roller conveyor 50 in accordance with the invention, is shown in FIG. 6, of which only one longitudinal beam 51 and three rollers 52 are depicted. The rollers 52 extend as cylindrical, rotationally symmetric bodies between the longitudinal beam 51 and a second parallel longitudinal beam. They are mounted in the two longitudinal beams 51 by axles or shafts 53, which extend through the respective longitudinal beam 51.

On the outer side of the longitudinal beam 51 the shaft 53 of the roller 52a carries a bevel gear 54, which intermeshes with a bevel gear 55, which is supported by means of a roller bearing 56 on a common drive shaft 57. The drive shaft 57 runs parallel to the longitudinal beam 51 and is set in rotation by a common drive motor. On its larger outer surface pointing in the axial direction, the bevel gear 55 carries a ferromagnetic disk 58, which stands opposite a carrier disk 59. The carrier disk 59 is coupled to the shaft 57 so that they rotate together. On its side opposite the bevel gear 55, the carrier disk 59 is provided in turn with several magnets 35 positioned at distances from each other, which are separated by an air gap from a ferromagnetic ring disk 58. Together with the ferromagnetic disk 58, the discrete magnets 35 form a hysteresis coupling, which corresponds in design to the hysteresis coupling from FIG. 3.

The roller 52b is likewise driven by a hysteresis coupling 22, which, however, is built like the hysteresis coupling shown in FIG. 2, thus with a radial gap. The bevel gear 55 here carries a bowl-shaped magnetic yoke 61, while the carrier 59 is provided with the magnetic ring 31. The operation is the same as for the hysteresis coupling 22 for the roller 52a.

Instead of providing the hysteresis coupling 22 on the input side relative to the bevel gears 44 and 55, alternatively the hysteresis coupling may be on the output side, as can be seen in connection with the roller 52c. The bevel gear 54 for the roller 52c is supported by means of a roller bearing 62 so that it can rotate on the axle 53. The bevel gear carries, in turn, on its rear side the ferromagnetic ring 58. The ferromagnetic ring 58 stands opposite individual magnets 35, which are polarized in an alternating and opposite way, and which are attached to a carrier 63, which sits on the axle 53 so that they rotate together. In contrast, the driven bevel gear 55 is connected to the input shaft 57 so that they rotate together. In each of the foregoing embodiments, it will be understood that instead of permanent magnets, electromagnets can also be used.

For the embodiments explained above, a hysteresis coupling is used as a frictionless coupling for coupling the rollers of the workpiece carrier or the pallet. Instead of the hysteresis coupling, a viscous coupling also can be used, as shown by the coupling 65 shown in FIG. 7. The viscous coupling has a closed, pot-shaped housing 66, which consists of a bowl-shaped base part 67 and a cover part 68. The bowl-shaped base part 67 is assembled in one piece and includes a base 69 and a cylindrical edge 72 projecting from this base. Concentric to the edge 71, there are several annular ribs or walls 72 in the interior of the bowl-shaped base part concentric to the edge 71.

Figure 7:
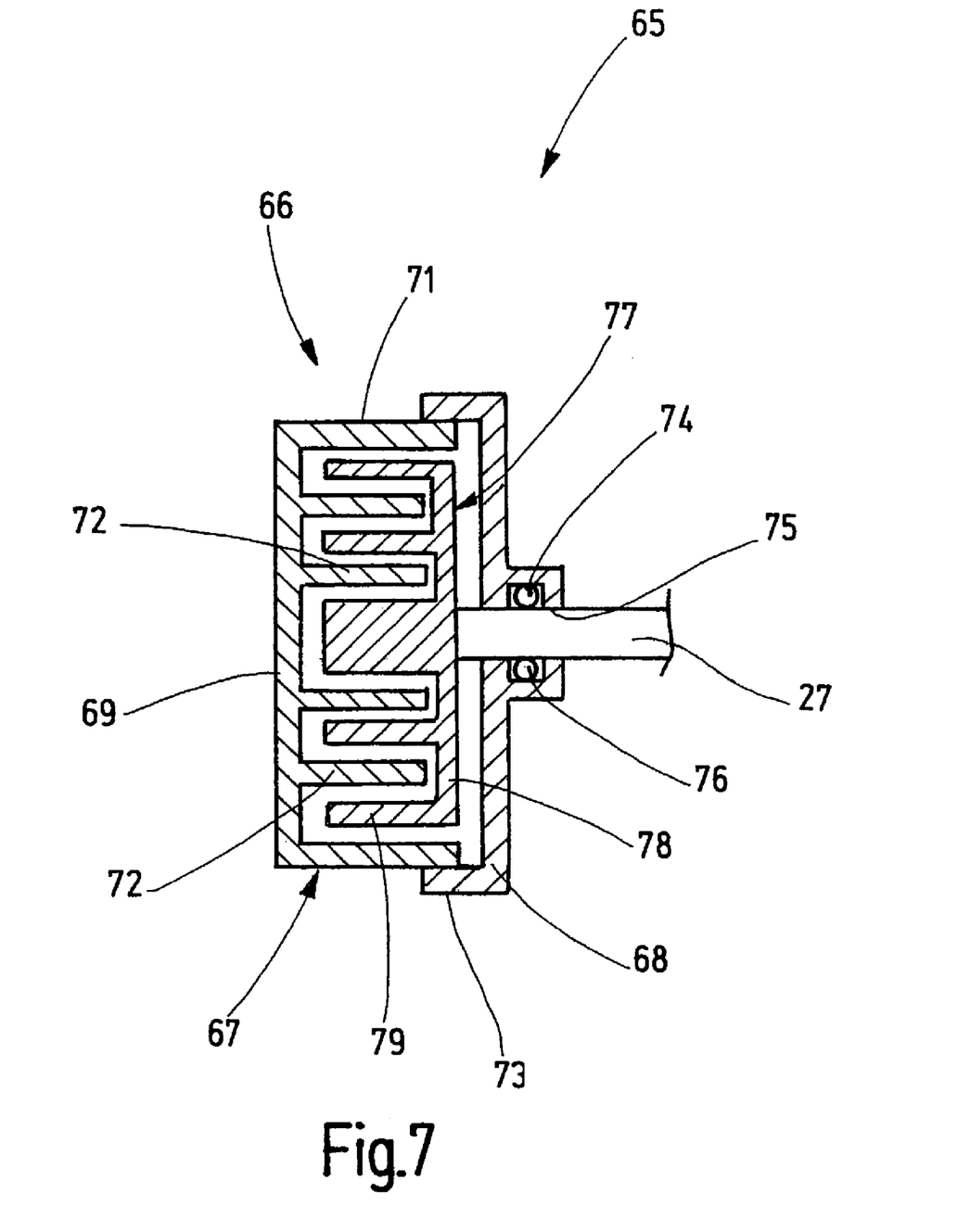
FIG. 7 is a longitudinal section of a viscous conveyor drive coupling in accordance with the invention.

The cover 68 is likewise bowl-shaped and grips at its edge 73 the edge 71 of the base part 67. In its middle section, the cover includes a tubular projection 74 that is concentric to the edge 71 and has a hole 75. An annular groove which surrounds the hole 75 holds an O-ring seal 76. The already described axle 27 is guided through the hole 75. The axle 27 is coupled to a rotor 77 in the housing 66 so that they rotate together. The rotor 77 consists of a disk 78 with the annular ribs 79 that are coaxial to the axle 27 and coaxial to the edge 71. Each rib 79 runs in a gap between adjacent ribs 72 or a rib 72 and the edge 71 of the base part 67 as shown.

In this way, a comb structure is produced, as can be seen from the figure, with intermeshing teeth. The meandering gap remaining between the ribs 72 and 79 or the edge 71 is filled with a viscous material which can transfer a shear force so that a torque can be transferred from the axle 27 to the housing 66, or vice versa.

It will be seen that the illustrated viscous coupling 65 can be used instead of the hysteresis couplings shown in FIGS. 2 and 3. The viscous coupling 56 similarly works without contact because the rotor 67 with its ribs 79 does not contact the ribs 72 or the edge 71.

The illustration in FIG. 7 is very simplified and it will be understood that it may be desirable in certain instances to provide ball bearings or the like for support of the shaft 27. Also, it is possible to form the ribs with a filigree pattern and to increase their number.

From the foregoing, it can be seen that a transport device for workpieces, pallets, or workpiece carriers is provided which has contact-free couplings in the form of a hysteresis coupling or a viscous coupling for the transfer of the required torque or the traction force. These couplings can either be integrated in the rollers or lie outside the rollers in the drive path to the rollers. Because these types of couplings operate without contact, they are free from wear and tear and thus require no maintenance.

What is claimed is:

1. A workpiece transport conveyor (1, 38, 50) comprising a workpiece transport support (4, 41, 52) having a workpiece transport surface (16, 43, 44) for carrying and transporting a workpiece, a drive (34) with a drive transmission (12, 45, 57) for moving the workpiece transport support (4, 41,45) in a transport direction, a traction device (18) for transferring drive energy between said drive (34) and workpiece transport support (4, 41, 52) for moving the workpiece transport support (4, 41, 45) in the transport direction, said traction device (18) having an input element (21, 46, 55, 54) and an output element (19, 44, 53), said traction device (18) having a contact free hysteresis coupling (22) for coupling the input and output element without physical contact therebetween, said hysteresis coupling (22) including a magnetic coupling element (19, 24, 31, 44, 53) and a hysteresis coupling element (32, 29, 48, 58), one of said coupling elements being coupled to said input element (21, 46, 55, 54) and the other of said coupling elements being coupled to said output element (19, 44, 53), said hysteresis coupling being operable for coupling said input element to said output element for transmitting drive energy from said input element to said output element and said workpiece support for causing unimpeded movement of said workpiece support in said transport direction, and said hysteresis coupling being uncouplable in response to movement of said workpiece transport support being interrupted for permitting contact free relative movement of said input element to said output element that interrupts the transmittal of drive energy from said input element to said output element and said workpiece transport support.

2. The transport conveyor of claim 1 in which the workpiece transport support is a transport roller (41, 52) of a roller conveyor (38, 50).

3. The transport conveyor of claim 1 in which said workpiece transport support is a pallet (4) of a circular pallet conveyor (1).

4. The transport conveyor of claim 1 in which the workpiece transport surface (43, 44, 52) is defined by cylindrical surfaces.

5. The transport conveyor of claim 1 in which the workpiece transport support (16) is a workpiece contact surface of a pallet (4).

6. The transport conveyor of claim 1 in which said input element (21, 46, 55, 54) includes at least one of a gear, chain wheel, bevel gear, work gear, or sprocket gear.

7. The transport conveyor of claim 1 in which said contact-free coupling (22) is encapsulated.

8. The transport conveyor of claim 1 in which said hysteresis coupling (22) defines an axial gap between said input and output elements.

9. The transport conveyor of claim 1 in which said hysteresis coupling (22) defines a radial gap between said input and output elements.

10. The transport conveyor of claim 1 in which said magnetic coupling element is permanently magnetized.

11. The transport conveyor of claim 1 in which said magnetic coupling element includes a group of discrete individual magnets (35) mounted on a carrier (24, 44, 59).

12. The transport conveyor of claim 11 in which said carrier (24, 44, 59) is disk-shaped.

13. The transport conveyor of claim 10 in which said permanently magnetized magnetic element is made from a single piece and magnetized with a plurality of magnetic poles alternating in polarity.

14. The transport conveyor of claim 10 in which permanently magnetized coupling element (21, 46, 55, 54) is disk-shaped.

15. The transport conveyor of claim 10 in which said permanently magnetized magnetic element (21, 46, 55, 54) is annular-shaped.

16. The transport conveyor of claim 10 in which said hysteresis and/or remanence element is a ferromagnetic element having an annular shape.

17. The transport conveyor of claim 16 in which said ferromagnetic element (32, 29, 48, 58) is pot shaped.

18. The transport conveyor of claim 1 in which said transmission (12, 45, 57) is positively connected to said input element (21, 46, 54).

19. A pallet circular conveyor for workpieces comprising a frame (2), at least one pallet (4) mounted for guided movement relative to said frame (2) in a transport direction, a drive (34) with a drive transmission (12, 45, 57) for moving said pallet (4), a traction device (19) having an input element (21, 46, 55, 54) connected to said transmission (12, 45, 57) and an output element (19, 44, 53) connected to said pallet (4), said input element (21, 46, 55, 54) being rotatable relative to said output element (19, 44, 53), said traction device (19) including a contact-free hysteresis coupling (22) by means of which the input element (21, 46, 55, 54) can be coupled to the output element (19, 44, 53) for transferring drive energy from said transmission (12, 45, 57) to said pallet (4) to drive the pallet in the transport direction, said hysteresis coupling (22) including a magnetic coupling element (19, 24, 31, 44, 53) and a hysteresis coupling element (32, 29, 48, 58), one of said coupling elements being coupled to said input element (21, 46, 55, 54) and the other of said coupling elements being coupled to said output element (19, 44, 53), said hysteresis coupling being operable for coupling said input element to said output element for transmitting drive energy from said input element to said output element and said pallet for causing unimpeded movement of said pallet in said transport direction, and said hysteresis coupling being uncouplable in response to movement of said pallet being interrupted for permitting contact free relative movement of said input element to said output element that interrupts the transmittal of drive energy from said input element to said output element and said pallet.

20. The pallet conveyor of claim 19 in which said drive transmission (12, 45, 57) includes one of a chain or tooth belt.

21. The pallet conveyor of claim 19 in which said input element (21, 46, 55, 54) includes one of a wheel gear, chain wheel, worm gear, bevel gear, or sprocket gear.

22. The pallet conveyor of claim 19 in which said contact-free coupling (22) is encapsulated.

23. The pallet conveyor of claim 19 in which said hysteresis coupling (22) defines an axial gap between said input and output elements.

24. The pallet conveyor of claim 19 in which said hysteresis coupling (22) defines a radial gap between said input and output elements.

25. The pallet conveyor of claim 19 in which said magnetic coupling element includes a group of discrete individual magnets (35) mounted on a carrier.

26. The pallet conveyor of claim 19 in which said magnetic element is a single piece permanently magnetized with a plurality of magnetic poles alternating in polarity.

27. The pallet conveyor of claim 19 in which said magnetic coupling element has a disk shape.

28. The pallet conveyor of claim 19 in which said hysteresis and/or remanence element is pot-shaped, annular or disk-shaped.

29. The pallet conveyor of claim 19 in which said input element is positively connected to said transmission.

30. A roller conveyor (38, 50) for workpieces comprising a frame (39, 51) having at least two rollers (41, 52) rotatably supported thereon, a drive (54, 45) with at least one transmission (12, 45, 57) for transmitting drive energy to said rollers (41, 52) for causing unimpeded movement of a workpiece along the roller conveyor, a traction device associated with each roller (41, 52), each traction device having an input element (21, 46, 55, 54) for connection to the transmission (12, 45, 57) and an output element (19, 44, 53) connected to a respective roller (41,52) to rotate the roller to provide a drive force in a transport direction, said input element (21, 46, 55, 54) of each traction device being rotatable relative to the respective output element (19, 44, 53), and at least one contact-free hysteresis coupling (22) for connecting said input elements without physical contact therebetween for permitting the transmission of drive energy between said drive device (54, 45) and said rollers (41, 52), said hysteresis coupling (22) including a magnetic coupling element (19, 24, 31, 44, 53) and a hysteresis coupling element (32, 29, 48, 58), one of said coupling elements being coupled to said input element (21, 46, 55, 54) and the other of said coupling elements being coupled to said output element (19, 44, 53), said hysteresis coupling being operable for coupling said input element to said output element for transmitting drive energy from said input element to said output element and said rollers for causing unimpeded movement of a workpiece along said rollers in said transport direction, and said hysteresis coupling being uncouplable in response to movement of a workpiece being interrupted for permitting contact free relative movement of said input element to said output element that interrupts the transmittal of drive energy from said input element to said output element and said rollers.

31. The roller conveyor of claim 30 in which said transmission (12, 45, 57) includes at least one of a chain, tooth belt, or beveled gear set.

32. The roller conveyor of claim 30 in which each said input element (21, 46, 55, 54) includes at least one of a gear, chain wheel, worm gear, bevel gear, or sprocket gear.

33. The roller conveyor of claim 30 in which said transmission includes a gear mounted co-axially on a shaft (53, 57).

34. The roller conveyer of claim 30 in which said contact-free hysteresis coupling (22) is arranged co-axially to said shaft (53, 57).

35. The roller conveyor of claim 34 including said hysteresis coupling arranged co-axial with an associated roller (44).

36. The roller conveyor of claim 30 in which said contact-free coupling (22) is encapsulated.

37. The roller conveyor of claim 30 in which said hysteresis coupling defines an axial gap between said input and output elements.

38. The roller conveyor of claim 30 in which said hysteresis coupling defines a radial gap between said input and output elements.

39. The roller conveyor of claim 30 in which said magnetic coupling is defined by a group of discrete individual permanently magnetized magnets (35) mounted on a carrier (44, 59, 63).

40. The roller conveyor of claim 39 in which said carrier is disk-shaped.

41. The roller conveyer of claim 30 in which said magnetic coupling element is a permanently magnetized element (21, 46, 55, 54) made from one piece and magnetized with several magnetic poles alternating in polarity.

42. The roller conveyor of claim 30 in which said magnetic coupling element is a permanently magnetized element having a disk or annular shape.

43. The roller conveyor of claim 30 in which said hysteresis and/or remanence coupling element is a ferromagnetic element (32, 29, 48, 55) having a pot shape, annular, or disk shape.

44. The roller conveyor of claim 30 in which said frame has at least two guide rails (2, 29, 51) between which said rollers are mounted.

45. The roller conveyor of claim 30 in which said input element (21, 46, 55, 54) is positively connected to said transmission (12, 45, 57).

46. A pallet circular conveyor for workpieces comprising at least one pallet (4), a frame (2) having at least two guide rails between which said pallet (4) is guided for movement in a transport direction relative to said frame (2), a drive (34) with a drive transmission (12, 45, 57) for moving said pallet (4), a traction device (19) having an input element (21, 46, 55, 54) connected to said transmission (12, 45, 57) and an output element (19, 44, 53) connected to said pallet (4) to drive the pellet in the transport direction, said input element (21, 46, 55, 54) being rotatable relative to said output element (19, 44, 53), said traction device (19) including a contact-free device (19) including a contact-free coupling (22) by means of which the input element (21, 46, 55, 54) can be coupled to the output element (19, 44, 53) for transferring drive energy from said transmission (12, 45, 57) to said pallet (4), said hysteresis coupling being operable for coupling said input element to said output element for transmitting drive energy from said input element to said output element and said pallet for causing unimpeded movement of said pallet in said transport direction, and said hysteresis coupling being uncouplable in response to movement of said pallet being interrupted for permitting contact free relative movement of said input element to said output element that interrupts the transmittal of drive energy from said input element to said output element and said pallet.

47. The workpiece transport conveyor of claim 1 in which said at least one of said input and output elements are disposed for rotation of movement, said hysteresis coupling being operable for securing said input and output elements against relative rotation for transmitting drive energy from said input element to said output element, and said at least one of said input and output elements being rotatable relative to the other upon uncoupling of said hysteresis coupling for interrupting the transmittal of drive energy from said input element to said output element and workpiece transfer support.

* * * * *